(12) United States Patent
Finck

(10) Patent No.: US 9,809,133 B2
(45) Date of Patent: Nov. 7, 2017

(54) RECLINING SEAT ASSEMBLY

(71) Applicant: James W Finck, Clarkston, MI (US)

(72) Inventor: James W Finck, Clarkston, MI (US)

(73) Assignee: FCA US LLC, Auburn Hills, MI (US)

(*) Notice: Subject to any disclaimer, the term of this patent is extended or adjusted under 35 U.S.C. 154(b) by 88 days.

(21) Appl. No.: 15/019,523

(22) Filed: Feb. 9, 2016

(65) Prior Publication Data

US 2016/0152162 A1 Jun. 2, 2016

Related U.S. Application Data

(62) Division of application No. 13/347,815, filed on Jan. 11, 2012, now abandoned.

(51) Int. Cl.
| | |
|---|---|
| *B60N 2/12* | (2006.01) |
| *B60N 2/22* | (2006.01) |
| *B60N 2/07* | (2006.01) |
| *B60N 2/23* | (2006.01) |
| *B60N 2/68* | (2006.01) |

(52) U.S. Cl.
CPC ............ *B60N 2/12* (2013.01); *B60N 2/0705* (2013.01); *B60N 2/2209* (2013.01); *B60N 2/233* (2013.01); *B60N 2/68* (2013.01); *B60N 2/686* (2013.01)

(58) Field of Classification Search
None
See application file for complete search history.

(56) References Cited

U.S. PATENT DOCUMENTS

| | | | |
|---|---|---|---|
| 1,149,421 A | 8/1915 | Wilmot | |
| 1,166,198 A | 12/1915 | Fischrupp | |
| 2,016,119 A | 10/1935 | Owler et al. | |
| 2,532,025 A | 11/1950 | Johnson | |

(Continued)

FOREIGN PATENT DOCUMENTS

| | | |
|---|---|---|
| DE | 102010023055 A1 | 12/2011 |
| EP | 0099414 A2 | 2/1984 |
| EP | 0869061 A2 | 10/1998 |

OTHER PUBLICATIONS

International Search Report dated Apr. 19, 2013, for International Application No. PCT/US2013/021117, International Filing Date Jan. 11, 2013.

(Continued)

*Primary Examiner* — David E Allred
(74) *Attorney, Agent, or Firm* — Ralph E Smith

(57) ABSTRACT

A reclining seat assembly includes a seat frame, and a backrest frame supported by the seat frame for pivoting movement about a backrest pivot axis. A seat pan has a forward portion supported by the seat frame for relative longitudinal movement, for example, using a slider. The seat pan has a rearward portion that is pivotally supported along a rear seat pan axis by a lower extension of the backrest frame, such that the backrest frame reclines relative to the seat frame upon forward longitudinal movement of the rear seat pan pivot axis relative to the seat frame. A backrest recline angle adjuster on the seat frame, such as a pair of linear actuators respectively coupling the seat frame to each side of the backrest frame along an actuator pivot axis that is itself offset from the backrest pivot axis, maintains a selected position of the rear seat pan support axis relative to the seat frame to thereby achieve a desired backrest inclination.

5 Claims, 4 Drawing Sheets

(56) References Cited

U.S. PATENT DOCUMENTS

| | | | |
|---|---|---|---|
| 2,596,760 A | | 5/1952 | Bryant |
| 2,823,731 A | | 2/1958 | Miller |
| 3,005,660 A | | 10/1961 | Winick |
| 3,046,055 A | | 7/1962 | Martens |
| 3,874,724 A | | 4/1975 | Re |
| 4,471,994 A | | 9/1984 | Zund et al. |
| 4,732,424 A | | 3/1988 | Uredat-Neuhoff |
| 4,761,033 A | | 8/1988 | Lanuzzi et al. |
| 4,796,952 A | | 1/1989 | Piretti |
| 4,986,601 A | * | 1/1991 | Inoue ............... A47C 1/03255 297/300.4 |
| 5,150,948 A | | 9/1992 | Volkle |
| 5,199,679 A | | 4/1993 | Nakamura et al. |
| 5,263,767 A | * | 11/1993 | Asbjornsen ........ A47C 1/03283 297/320 |
| 5,308,144 A | * | 5/1994 | Korn ............... A47C 1/03255 297/300.2 |
| 5,360,256 A | | 11/1994 | Miller et al. |
| 5,634,534 A | | 6/1997 | Kanai et al. |
| 5,660,440 A | | 8/1997 | Pejathaya |
| 5,871,259 A | | 2/1999 | Gehart |
| 5,931,531 A | | 8/1999 | Assmann |
| 6,010,195 A | | 1/2000 | Masters et al. |
| 6,095,609 A | | 8/2000 | Magadanz |
| 6,644,743 B1 | | 11/2003 | Lin |
| 6,709,057 B2 | | 3/2004 | Sander et al. |
| 6,729,688 B2 | | 5/2004 | Erne |
| 6,902,236 B2 | | 6/2005 | Tame |
| 7,374,245 B2 | | 5/2008 | Tanaka et al. |
| 7,828,384 B2 | | 11/2010 | Shinozaki |
| 2010/0109404 A1 | | 5/2010 | Yamagishi et al. |
| 2010/0259081 A1 | | 10/2010 | Kuno |
| 2013/0169017 A1 | | 7/2013 | Masunaga et al. |

OTHER PUBLICATIONS

Written Opinion dated Apr. 19, 2013 for International Application No. PCT/US2013/021117, International Filing Date Jan. 11, 2013.

\* cited by examiner

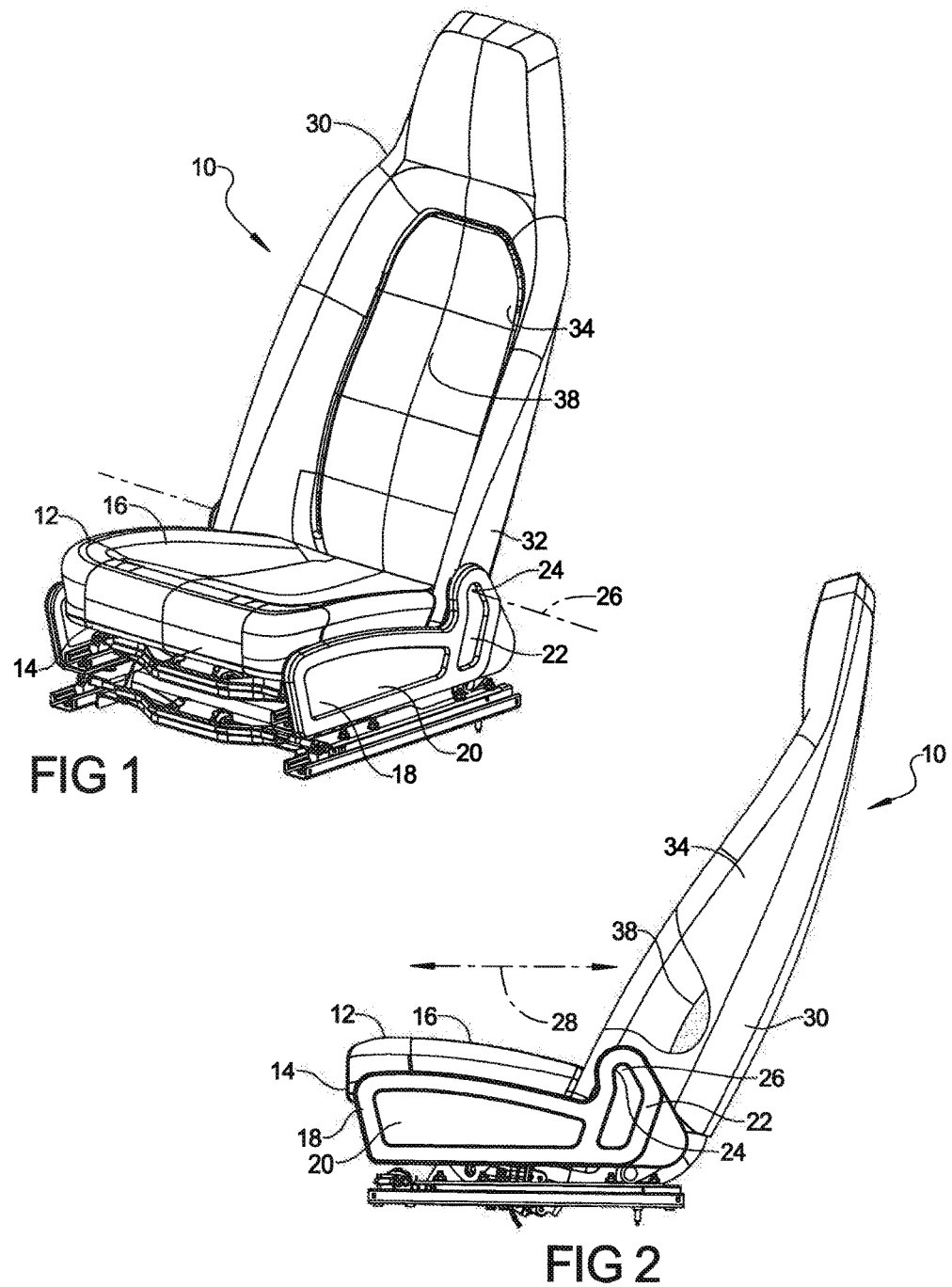

RECLINING SEAT ASSEMBLY

CROSS-REFERENCE TO RELATED APPLICATIONS

This application is a divisional of U.S. patent application Ser. No. 13/347,815 filed on Jan. 11, 2012. The entire disclosure of the above application is incorporated herein by reference.

FIELD OF THE INVENTION

The invention relates to reclining seats, particularly those employed in a relatively forward one of a plurality of rows of seats in a passenger vehicle, such as the vehicle's front row seats.

BACKGROUND OF THE INVENTION

Known reclining seat designs for vehicles typically employ seat and backrest cushion supports that each include a suspension matt stretched between spaced frame members to respectively support the seat and backrest cushions. The relative outboard location of these spaced frame members within the seat and backrest means that these seat and backrest frame members occupy space, for example, along the lateral edges of the backrest that might otherwise be used to accommodate rear seat passengers, particularly those with longer-than-average legs. Additionally, frame cross-members bridging the spaced frame members, for example, along the rear portion of the seat cushion support and the bottom portion of the backrest support, may also contribute to a reduction in available rear seat passenger foot room.

Further, such known reclining seat designs employ a seat-to-backrest pivot axis that lies within a plane situated behind, as well as perhaps beneath, the seated passenger. When a seated passenger adjusts the backrest inclination, the passenger's upper torso is displaced longitudinally relative to fixed points within the vehicle, such as the vehicle's steering wheel, infotainment systems, and interior storage, which may require a subsequent fore-aft adjustment of the entire seat in order to restore the passenger's desired relation to these fixed points in the vehicle. The rearward placement of known backrest pivots may also generate an aesthetically-less-desirable gap between the seat cushion and the backrest cushion as the inclination of the backrest is changed.

SUMMARY OF THE INVENTION

In accordance with an aspect of the invention, a seat assembly includes a seat frame, and a backrest frame supported by a rear portion of the seat frame so as to pivot about a first, backrest pivot axis defined by the rear portion of the seat frame. The seat assembly further includes a seat pan having a forward portion supported by the seat frame for relative longitudinal movement, for example, by a coupling including a seat pan-mounted guide rod and seat-frame mounted slider. A rearward portion of the seat pan is supported by the backrest frame for pivotal movement about a second, rear seat pan pivot axis defined by the backrest frame that is generally below and parallel to the backrest pivot axis, whereby the backrest frame reclines relative to the seat frame upon forward longitudinal movement of the rear seat pan pivot axis relative to the seat frame.

For example, in an exemplary embodiment, the seat frame includes a pair of laterally-spaced side members whose rear portions define a first pair of transversely-aligned bores which cooperate with complementary projections or pins on the backrest frame to define the backrest pivot axis, about which the backrest frame is pivotally supported on the seat frame. A second set of transversely-aligned bores formed within downward extensions of the backrest frame in turn define the rear seat pan pivot axis, about which to pivotally support the rear portion of the seat pan using a pair of complementary, outwardly-extending projections on the seat pan. It will be appreciated that the use of such integrally-formed projections on a contoured seat pan can advantageously obviate the need for a rigid cross-member that otherwise typically extends across the rear of the seat frame, beneath the rear of the seat cushion, thereby improving available foot room for rear seat passengers.

In accordance with another aspect of the invention, a backrest recline angle adjuster coupled to the backrest frame maintains the rear seat pan pivot axis in a selected one of a plurality of longitudinal positions relative to the seat frame. In an exemplary embodiment, the backrest recline angle adjuster includes a pair of actuators carried on the seat frame beneath the seat pan which are respectively pivotally coupled to downward extensions of the backrest frame. By way of example only, in the exemplary embodiment, the backrest recline angle adjuster includes a pair of linear actuators each having a track mounted longitudinally on the seat frame, and a slide that is coupled by a first link to the backrest frame for rotation about an actuator axis that is offset from and generally parallel to the backrest pivot axis. Also in an exemplary embodiment, the actuator axis is offset from the rear seat pan pivot axis to thereby advantageously provide a slightly longer lever arm on the backrest frame with which to maintain backrest inclination using the adjuster. In another exemplary embodiment, the backrest recline angle adjuster is a manual adjuster adapted to maintain a selected one of a plurality of available positions of the backrest pivot axis relative to the seat frame. In yet another exemplary embodiment, the backrest recline angle adjuster includes linear actuators in the form of screw drives having a first end pivotally mounted on the seat frame, whose respective threaded rods are concurrently driven by a common motor mounted on the seat frame to achieve and thereafter maintain a selected one of a plurality of available positions of the backrest pivot axis relative to the seat frame.

In accordance with another aspect of the invention, the backrest pivot axis as defined by the seat frame is preferably located relatively forward of the rearward-most backrest cushion surface when the backrest frame is in an upright position, to thereby position the backrest pivot axis relatively closer to the nominal hip joint of a seated passenger. Still further, because the rear portion of the seat pan is pivotally coupled to the backrest frame along the rear seat pan pivot axis, the gap formed between the seat cushion and the backrest cushion is preferably optimized for aesthetics and seated passenger comfort through optimization of the offset between the backrest and rear seat pan pivot axes. A formed structural seat pan, as supported by the backrest frame for pivotal movement about the rear seat pan pivot axis, advantageously provides additional foot room for passengers seated behind the seat assembly, while a formed structural backrest frame advantageously provides increased rear seat passenger knee room, and legroom relative to known reclining seats.

From the foregoing, it will be appreciated that a reclining seat assembly in accordance with the invention beneficially provides a more ergonomic recline geometry for a seated front row passenger by supporting the rear of the seat pan along the seat pan pivot axis at points on the backrest frame that are relatively lower than the backrest pivot axis.

Other objects, features, and advantages of the present invention will be readily appreciated upon a review of the subsequent description of several exemplary embodiments and the appended claims, taken in conjunction with the accompanying Drawings.

BRIEF DESCRIPTION OF THE DRAWINGS

FIG. 1 is perspective view of a first exemplary reclining seat assembly for a vehicle, in accordance with the invention;

FIG. 2 is a side view of the first seat assembly of FIG. 1;

DETAILED DESCRIPTION OF THE PREFERRED EMBODIMENTS

Figure 3:
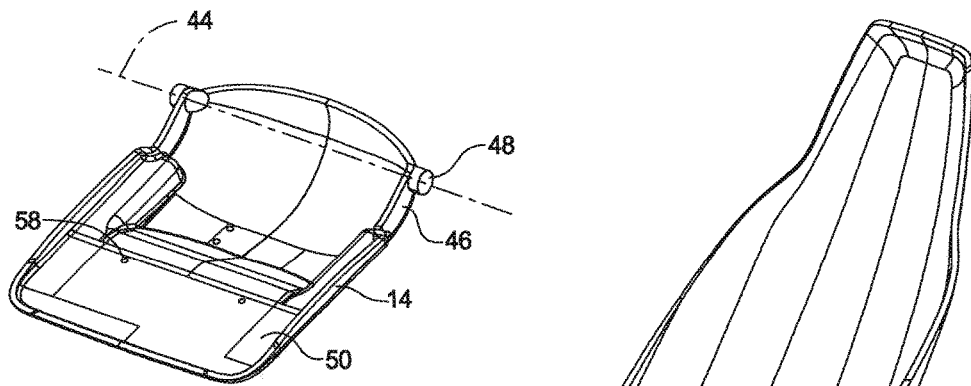
FIGS. 3 and 4 are perspective views of the contoured seat pan and contoured backrest frame, respectively, of the first seat assembly of FIG. 1.

Referring to FIGS. 1-5, a first exemplary reclining seat assembly 10 for a vehicle includes a bottom seat (hereinafter "seat 12") including a seat pan 14 and seat cushion 16 supported atop a seat frame 18. The seat frame 18 includes side members 20 whose raised rear portions 22 include a first pair of transversely-aligned bores 24 with which to define a backrest pivot axis 26 that, in the case of a forward-facing vehicle seat assembly, is generally perpendicular to the nominal longitudinal axis 28 of the vehicle.

A seat back or backrest 30 including a backrest frame 32 and backrest cushion 34 is supported on the seat frame 18 for pivoting movement about the backrest pivot axis 26 by a pair of complementary projections 36 on the backrest frame 32 that are pivotally received within the seat frame's side member bores 24. As best seen in FIGS. 1 and 2, the backrest pivot axis 26 as defined by the side members 20 is located relatively forward of the backrest cushion's central forward-facing surface 38 when the backrest 30 is disposed in a generally upright position. In this way, the backrest pivot axis 26 is advantageously positioned relatively closer to the nominal hip joint of a vehicle passenger seated in the seat assembly 10. The backrest frame 32 is preferably also contoured to fit an average front seat passenger, with the outboard edges of the backrest curving forward to thereby open up additional space behind the backrest 30 for use by a rear seat passenger, which would otherwise be occupied by conventional backrest frames.

Figure 4:
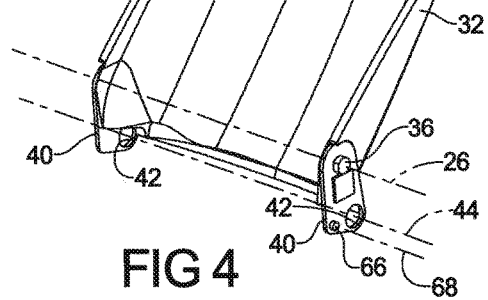
Figure 5:
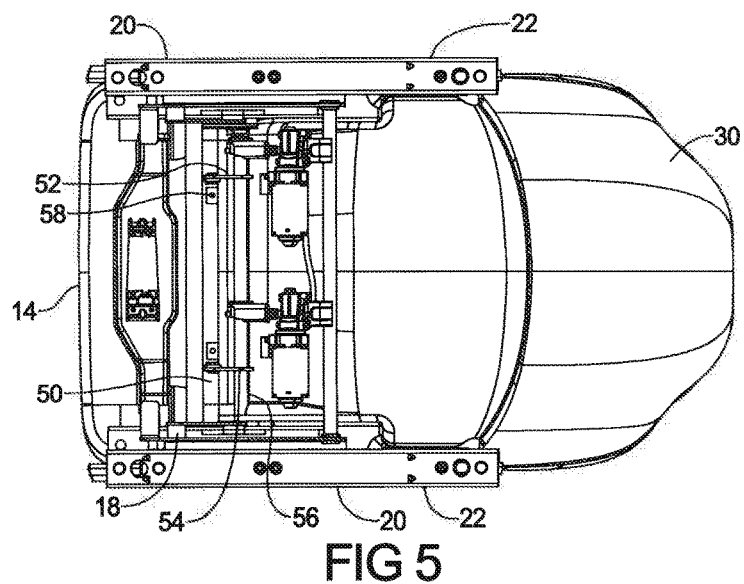
FIG. 5 is a bottom view of the first seat assembly of FIG. 1.

As best seen in FIG. 3-5, the backrest frame 32 includes downward extensions 40 (relative to the backrest pivot axis 26) which include a second pair of transversely-aligned bores 42 with which to define a rear seat pan pivot axis 44 that is generally below and parallel to the backrest pivot axis 26 when the backrest 30 is disposed in a generally upright position. The rear portion 46 of the seat pan 14 is pivotally supported by the downward extensions 40 of the backrest frame 32 upon receipt in bores 42 of a pair of outwardly-extending projections or pins 48 defined on the rear portion 46 of the seat pan 14. It will be appreciated that, when the pins 48 are integrally formed on the seat pan 14, for example, by casting, the resulting "contoured" seat pan 14 can advantageously obviate the need for a rigid cross-member that otherwise typically extends across the rear of the seat frame, beneath the rear of the seat cushion, thereby improving available foot room for back seat passengers. The forward portion 50 of the seat pan 14 is supported on the seat frame 18 for relative longitudinal movement by a coupling 52 including a pair of links 54 pivotally mounted on a forward seat frame cross-member 56 and suitably secured to the underside of the seat pan 14 as by fasteners 58.

Figure 6:
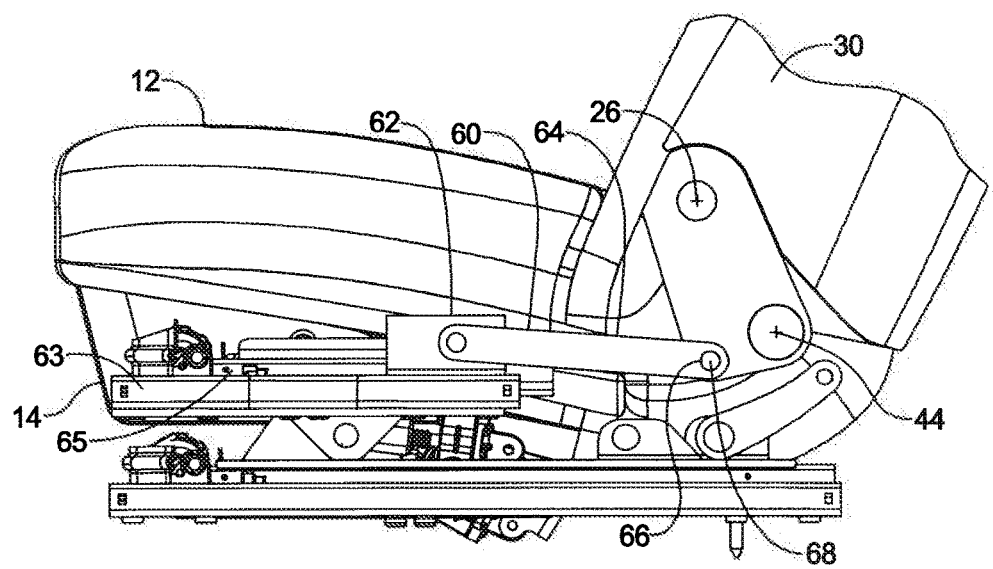
FIGS. 6 and 7 are partial side views of the first seat assembly of FIG. 1, with the seat frame's side member removed to show movement of the seat/seat cushion and backrest relative to each other, to the seat frame, and to a seat frame-mounted seat track.

By way of further example, in the first seat assembly 10 as illustrated in FIG. 6, the rear seat pan pivot axis 44 is located perhaps about 100 mm lower than, and perhaps about 30 mm rearward of, the backrest pivot axis 26 when the backrest 30 is adjusted to a generally upright position relative to the seat frame 18. In this manner, the offset between the seat cushion 16 and the backrest cushion 34 advantageously remains substantially unchanged relative to the seated passenger across a range of backrest recline angles, thereby reducing the likelihood of an unsightly gap between the seat cushion 16 and the backrest cushion 34 at any given backrest recline angle, and to advantageously permit the backrest 30 to recline flat without creating a vertical step between the seat cushion 16 and the backrest cushion 34. The seat cushion 16 also preferably includes multi-density foam to thereby provide suitable cushioning to a seated passenger while obviating the need for a suspension matt and surrounding cushion frame, to provide additional foot room for back row passengers. As can be seen from FIGS. 6 and 7, backrest frame 32 reclines relative to seat frame 18 upon forward longitudinal movement of the rear seat pan axis 44 relative to the seat frame 18 and to backrest pivot axis 26.

Figure 7:
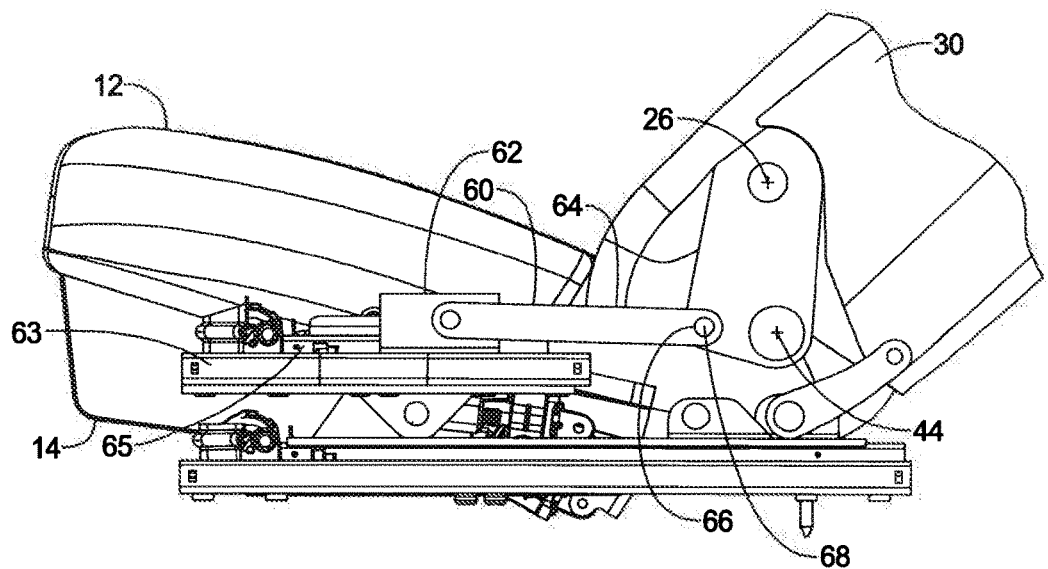

Referring again to FIG. 6, and also to FIG. 7, the first seat assembly 10 features a backrest recline angle adjuster 60 that includes a pair of linear actuators 62 comprising a track (63) mounted on the seat frame 18 with a slide (65) hat is coupled with a link 64 to pins 66 mounted on the downward extensions 40 on either side of the backrest frame 32, for pivoting movement about an actuator axis 68 that is offset from and generally parallel to the backrest pivot axis 26. In the first seat assembly 10, the actuator axis 68 is offset from the rear seat pan pivot axis 44 to thereby advantageously provide a slightly longer lever arm on the backrest frame extension 40 with which to control backrest recline angle using the backrest recline angle adjuster 60. It will be appreciated that the backrest recline angle adjuster is advantageously located forward and under the seat cushion 16 and seat pan 14, rather than along the pivot axis 26 of the backrest 30 as is typical of know reclining seat assemblies.

Figure 8:
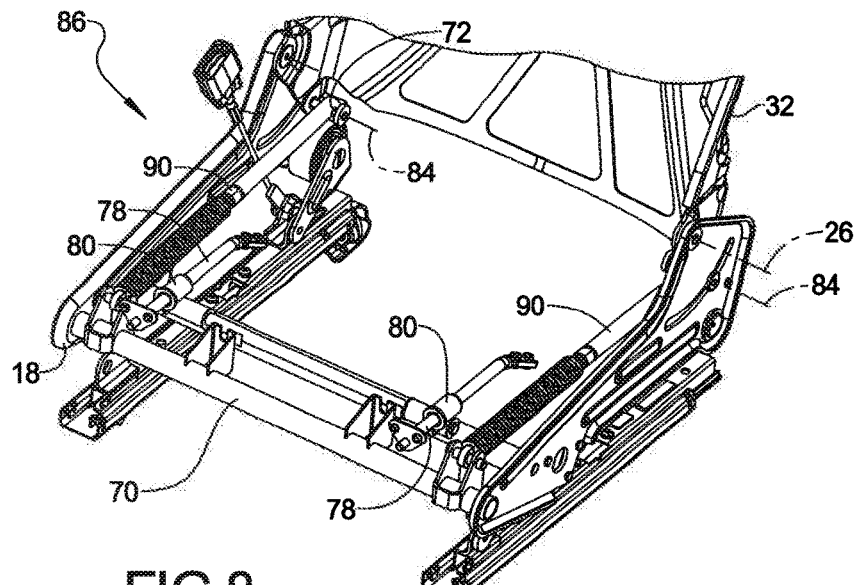
FIG. 8 is a partial perspective view of the seat frame, backrest frame, and backrest recline angle adjuster of a second exemplary reclining seat assembly, featuring a pair of manual backrest recline angle adjusters with which to maintain the position of the rear seat pan pivot axis relative to the seat frame, wherein the actuators are pivotally mounted to the seat frame's front cross-member.
Figure 9:
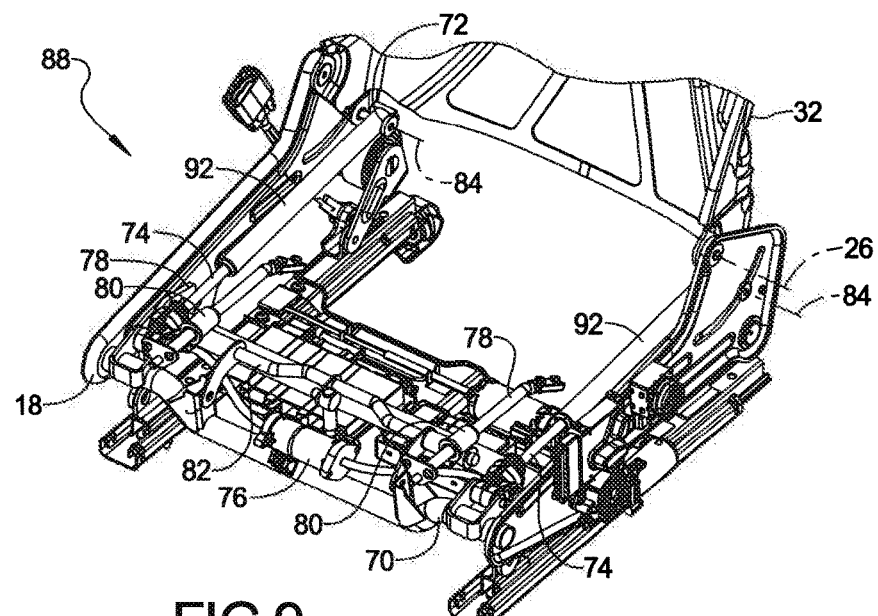
FIG. 9 is a partial perspective view of the seat frame, backrest frame, and backrest recline angle adjuster of a third exemplary reclining seat assembly, similar to that of FIG. 8, wherein the manual recline adjuster is replaced with a motor-driven screw drive.

Referring to FIGS. 8 and 9, a second and third exemplary reclining seat assembly 86, 88 respectively include a pair of linear actuators 90, 92 that are pivotally mounted to a forward seat frame cross-member 70 and directly coupled to a corresponding actuator pivot pin 72 on the backrest frame 32. In the third seat assembly 88, the linear actuator 92 includes a screw drive 74 that is powered by a motor 76 mounted on the seat frame 18. Further, in each of the second and third seat assemblies 86, 88, the forward portion of the seat pan (not shown) includes a pair of generally longitudinally-extending guide rods 78 that are received within the complementary bores of sliders 80 that are themselves pivotally mounted on a forward seat frame cross-member 82, to thereby support the seat pan for relative longitudinal movement on the seat frame 18. It will be seen that the actuator pivot pin 72 for the linear actuators 90, 92 of the second and third seat assemblies 86, 88 defines an actuator axis 84 that is collinear with the rear seat pan pivot axis.

From the foregoing, it will be appreciated that a reclining seat assembly in accordance with the invention advantageously improves rear seat passenger foot, knee room, and legroom improvement, while further providing a seated passenger with improved comfort due to a more ergonomic backrest-recline-axis geometry.

While the above description constitutes an exemplary embodiment, it will be appreciated that the invention is susceptible to modification, variation and change. For example, while the invention is disclosed above in connection with the front seat of a passenger vehicle, it will be appreciated that the invention is equally suited for other seating applications, including without limitation aircraft and other vehicle seating, and reclining chairs generally. Further, the invention contemplates providing a pivot release on one of the seat pan and backrest, as through use of a release bracket, to thereby permit forward rotation of the backrest about the upper axis into a folded or "stowed" position. And, while the exemplary reclining seat assemblies described above feature a contoured rear surface on the backrest to enhance knee room/legroom of a rear seat passenger, as best seen in FIGS. 1 and 3, it will be appreciated that the invention alternatively contemplates use, for example, of a more conventional, "flatter" rear surface on the backrest, such that the relatively outboard space on the backrest aft of the first pivot may advantageously define integrated storage space, or perhaps even a ventilation duct by which to deliver climate-controlled air to a rear seat passenger. Similarly, while the exemplary embodiment employs a multi-density foam seat cushion supported by the seat pan to obviating the need for a suspension matt and surrounding cushion frame, it will be appreciated that, where desired, the seat pan may otherwise include an additional or alternative suspension mechanism underpinning the seat cushion or seating surface.

Further, it will be appreciated that the relative height of the backrest pivot axis may be adjusted, relative to the overall height of the backrest and the rear seat pan pivot axis, to advantageously achieve a desired correlation between a given longitudinal displacement of the seat pan and a given change in the angle of inclination of the backrest. And, while the rear portion of the seat pan of the disclosed exemplary seat assemblies are directly coupled to the downwardly-extending lower portion of the backrest frame, it will be appreciated that the rear portion of the seat pan may be indirectly coupled to the backrest frame by a pair of seat pan-supporting links which, for example, either rotate in unison with the backrest frame about the backrest pivot axis or are alternatively driven by a suitable cam, gearing, or other arrangement to thereby rotate at a different speed, or in a nonlinear relation, with respect to the backrest frame.

What is claimed is:
1. A reclining seat assembly comprising:
a seat frame defining a longitudinal axis and a backrest pivot axis generally perpendicular to the longitudinal axis;
a backrest frame supported by the seat frame for movement about the backrest pivot axis, wherein the backrest frame defines a rear seat pan pivot axis generally below and parallel to the backrest pivot axis;
a seat pan having a forward portion and a rearward portion, wherein the forward portion of the seat pan is supported by the seat frame for relative longitudinal movement, and the rearward portion of the seat pan is supported by the backrest frame for pivotal movement about the rear seat pan pivot axis, whereby the backrest frame reclines relative to the seat frame upon forward longitudinal movement of the rear seat pan pivot axis relative to the seat frame;
a backrest recline angle adjuster coupled to the backrest frame, the adjuster maintaining the rear seat pan pivot axis in a selected one of a plurality of longitudinal positions relative to the seat frame;
the backrest frame defines an actuator pivot axis generally below and parallel to the backrest pivot axis;
the adjuster includes a linear actuator carried on the seat frame, the actuator being pivotally coupled to the backrest frame along the actuator pivot axis, wherein the actuator pivot axis is collinear with the rear seat pan pivot axis; and
the forward portion of the seat pan is coupled to the seat frame by a coupling mounted on the seat frame wherein the coupling includes a guide rod and a slider.

2. The seat assembly of claim 1, wherein the guide rod extends generally longitudinally on the seat pan, and the slider is pivotally mounted on a forward portion of the seat frame.

3. The seat assembly of claim 1, wherein the coupling includes a pair of parallel links pivotally mounted on a forward portion of the seat frame.

4. A reclining seat assembly comprising:
a seat frame defining a longitudinal axis and a backrest pivot axis generally perpendicular to the longitudinal axis;
a backrest frame supported by the seat frame for movement about the backrest pivot axis, wherein the backrest frame defines a rear seat pan pivot axis generally below and parallel to the backrest pivot axis;
a seat pan having a forward portion and a rearward portion, wherein the forward portion of the seat pan is supported by the seat frame for relative longitudinal movement, and the rearward portion of the seat pan is supported by the backrest frame for pivotal movement about the rear seat pan pivot axis, whereby the backrest frame reclines relative to the seat frame upon forward longitudinal movement of the rear seat pan pivot axis relative to the seat frame;
a backrest recline angle adjuster coupled to the backrest frame, the adjuster maintaining the rear seat pan pivot axis in a selected one of a plurality of longitudinal positions relative to the seat frame;
the backrest frame defines an actuator pivot axis generally below and parallel to the backrest pivot axis; and
the adjuster includes a linear actuator carried on the seat frame, the actuator being pivotally coupled to the backrest frame along the actuator pivot axis, wherein the actuator pivot axis is collinear with the rear seat pan pivot axis.

5. The seat assembly of claim 4, wherein the actuator includes a screw drive coupling the seat frame to the actuator pivot axis.

\* \* \* \* \*